US008583428B2

(12) United States Patent
Tashev et al.

(10) Patent No.: US 8,583,428 B2
(45) Date of Patent: Nov. 12, 2013

(54) SOUND SOURCE SEPARATION USING SPATIAL FILTERING AND REGULARIZATION PHASES

(75) Inventors: Ivan Tashev, Kirkland, WA (US); Lae-Hoon Kim, Champaign, IL (US); Alejandro Acero, Bellevue, WA (US); Jason Scott Flaks, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 491 days.

(21) Appl. No.: 12/815,408

(22) Filed: Jun. 15, 2010

(65) Prior Publication Data

US 2011/0307251 A1 Dec. 15, 2011

(51) Int. Cl.

| | |
|---|---|
| ***G10L 21/02*** | (2013.01) |
| ***G10L 15/20*** | (2006.01) |
| ***G10L 15/00*** | (2013.01) |
| ***G10L 11/06*** | (2006.01) |

(52) U.S. Cl.

USPC ........... 704/226; 704/233; 704/231; 704/210; 704/215; 704/228

(58) Field of Classification Search

USPC .................. 704/233, 226, 231, 210, 215, 228

See application file for complete search history.

(56) References Cited

U.S. PATENT DOCUMENTS

| | | | | |
|---|---|---|---|---|
| 5,999,567 | A * | 12/1999 | Torkkola | 375/232 |
| 6,424,960 | B1 * | 7/2002 | Lee et al. | 706/20 |
| 6,563,803 | B1 * | 5/2003 | Lee | 370/290 |
| 7,047,189 | B2 | 5/2006 | Acero et al. | |
| 7,099,821 | B2 * | 8/2006 | Visser et al. | 704/226 |
| 7,970,564 | B2 * | 6/2011 | Wang et al. | 702/66 |
| 8,005,237 | B2 * | 8/2011 | Tashev et al. | 381/92 |
| 8,175,871 | B2 * | 5/2012 | Wang et al. | 704/227 |
| 8,223,988 | B2 * | 7/2012 | Wang et al. | 381/92 |
| 8,447,595 | B2 * | 5/2013 | Chen | 704/225 |
| 2001/0037195 | A1 * | 11/2001 | Acero et al. | 704/200 |
| 2003/0179888 | A1 * | 9/2003 | Burnett et al. | 381/71.8 |
| 2005/0018836 | A1 * | 1/2005 | Beaucoup et al. | 379/406.01 |
| 2007/0021958 | A1 * | 1/2007 | Visser et al. | 704/226 |
| 2008/0027714 | A1 | 1/2008 | Hiekata et al. | |
| 2008/0306739 | A1 | 12/2008 | Nakajima et al. | |
| 2012/0072210 | A1 * | 3/2012 | Suzuki et al. | 704/226 |
| 2012/0120218 | A1 * | 5/2012 | Flaks et al. | 348/77 |

OTHER PUBLICATIONS

Asano, F. ;Ikeda, S. ; Ogawa, M. ; Asoh, H. ; Kitawaki, N. , Combined approach of array processing and independent component analysis for blind separation of acoustic signals , May 2003, IEEE Transactions on Speech and Audio Processing, vol. 11;Issue: 3, pp. 204-215.*

(Continued)

*Primary Examiner* — Edgar Guerra-Erazo

(74) *Attorney, Agent, or Firm* — Gonzalez Saggio & Harlan LLP

(57) ABSTRACT

Described is a multiple phase process/system that combines spatial filtering with regularization to separate sound from different sources such as the speech of two different speakers. In a first phase, frequency domain signals corresponding to the sensed sounds are processed into separated spatially filtered signals including by inputting the signals into a plurality of beamformers (which may include nullformers) followed by nonlinear spatial filters. In a regularization phase, the separated spatially filtered signals are input into an independent component analysis mechanism that is configured with multi-tap filters, followed by secondary nonlinear spatial filters. Separated audio signals are the provided via an inverse-transform.

20 Claims, 4 Drawing Sheets

(56) References Cited

OTHER PUBLICATIONS

Kolossa D.; Orglmeister R., Nonlinear Postprocessing for Blind Speech Separation, 2004, Proc. ICA'2004, pp. 832-839 2004.*

Wang C.; Brandstein M.S., Multi-source face tracking with audio and visual data, 1999, 1999 IEEE 3rd Workshop, pp. 169-174.*

Dhir C.S.;Park H.; Lee S., Directionally Constrained Filterbank ICA, Aug. 2007, Signal Processing Letters IEEE, vol. 14; Issue 8, pp. 541-544.*

Malvar, "A Modulation Complex Lapped Transform and Its Applications to Audio Processing", 1999.*

Günel, et al., "Blind Source Separation and Directional Audio Synthesis for Binaural Auralization of Multiple Sound Sources using Microphone Array Recordings", Retrieved at <<http://scitation.aip.org/getpdf/servlet/GetPDFServlet?filetype=pdf&id=PMARCW000004000001060001000001&idtype=cvips&prog=normal>>, Proceedings of Meetings on Acoustics, vol. 4, Aug. 6, 2008, pp. 1-7.

Valin, et al., "Robust Recognition of Simultaneous Speech by a Mobile Robot", Retrieved at <<http://ieeexplore.ieee.org/stamp/stamp.jsp?tp=&arnumber=4285864&isnumber=4285839>>, IEEE Transactions on Robotics, vol. 23, No. 4, Aug. 2007, pp. 742-752

Seltzer, et al., "Microphone Array Post-Filter using Incremental Bayes Learning to Track the Spatial Distributions of Speech and Noise", Retrieved at <<http://thamakau.usc.edu/Proceedings/ICASSP%202007/pdfs/0100029.pdf >>, Proceedings of the IEEE International Conference on Acoustics, Speech and Signal Processing, ICASSP, Apr. 15-20, 2007, pp. 29-32.

Virtanen, Tuomas., "Sound Source Separation in Monaural Music Signals", Retrieved at <<http://www.cs.tut.fi/sgn/arg/music/tuomasv/virtanen_phd.pdf>>, Ph.D. dissertation, 2006, pp. 134.

Valin, et al., "Robust 3d Localization and Tracking of Sound Sources using Beam forming and Particle Filtering", Retrieved at <<http://people.xiph.org/~jm/papers/valin_icassp2006.pdf>>, In Proceedings International Conference on Audio, Speech and Signal Processing, 2006, pp. 4.

Drake, et al., "Sound Source Separation via Computational Auditory Scene Analysis Enhanced beam forming", Retrieved at <<http://ivpl.eecs.northwestern.edu/system/files/01191040.pdf>>, In Proceedings of the 2nd IEEE Sensor Array and Multichannel Signal Processing Workshop, Aug. 2002, pp. 259-263.

Saruwatari, et al., "Blind Source Separation Based on a Fast-Convergence Algo-rithm Combining ICA and Beamforming", Retrieved at <<http://www.iesk.ovgu.de/iniesk_media/bilder/ks/publications/pickings/eurospeech_2001_aalborg/page2603.pdf>>, Eurospeech, 2001, pp. 4.

Araki, et al., "The Fundamental Limitation of Frequency Domain Blind Source Separation for Convolutive Mixtures of Speech", Retrieved at <<http://ieeexplore.ieee.org//stamp/stamp.jsp?tp=&arnumber=01193577>>, IEEE Transactions on Speech and Audio Processing, vol. 11, No. 2, Mar. 2003, pp. 109-116.

Beerends, et al., "Perceptual evaluation of speech quality (PESQ), an objective method for end-to-end speech quality assessment of narrowband telephone network and speech codecs", Retrieved at <<http://www.mp3-tech.org/programmer/docs/2001-P03b.pdf>>, Journal of the Audio Engineering Society, Oct. 2002, pp. 1-27.

Malvar, Henrique., "A modulated complex lapped transform and its application to audio processing", Retrieved at <<http://research.microsoft.com/pubs/69702/tr-99-27.pdf>>, Technical Report, MSR-TR-99-27, May 1999, pp. 1-9.

Sawada, et al., "Polar Coordinate Based Nonlinear Function for Frequency-Domain Blind Source Separation", Retrieved at <<http://www.tara.tsukuba.ac.jp/~maki/reprint/Sawada/hs02icassp1001-1004.pdf >>, In Proceedings of ICASSP, 2002, pp. 1001-1004.

* cited by examiner

SOUND SOURCE SEPARATION USING SPATIAL FILTERING AND REGULARIZATION PHASES

BACKGROUND

In many hands-free sound capture scenarios (e.g., gaming, speech recognition, communication and so forth) there are two or more human speakers talking at the same time. Speech separation, which refers to simultaneous capture and separation of human voices by audio processing, is desirable in many such scenarios.

For example, in some game applications that involve speech recognition and voice commands, it is highly desirable to separate the voices of simultaneous talkers located in the same general area. These separated voices may be each sent for speech recognition such that the recognized commands may be applied to each player separately. Also, speech from one speaker may be sent to a corresponding recipient in case of multiparty online gaming.

Sound source separation is generally similar, except that not all captured sounds need be speech. For example, sound source separation can be used as a speech or other sound enhancement technique, such as to separate the desired speech or sounds from undesired signals such as noise or ambient speech. As one more particular example, sound source separation may facilitate voice control of multimedia equipment, for example, in which the voice control commands from one or more speakers are received in various acoustic environments (e.g., with differing noise levels and reverberation conditions).

Sound source/speech separation may be accomplished via a beamformer, which uses spatial separation of the sources to separately weigh the signals from an array of microphones, and thereby amplify/boost signals received from different directions differently. A nullformer operates similarly, but nulls/suppresses interferences based on such spatial information. Beamformers are relatively simple, converge quickly, and are robust, however they are somewhat imprecise and do not separate interfering signals as well in a real world situation where reflections of the interfering source come from many different angles.

Sound source/speech separation also may be accomplished by independent component analysis. This technique is based on statistical independence, and works by maximizing non-Gaussianity or mutual independence of sound signals. While independent component analysis can result in a high degree of separation, because it has many parameters independent component analysis is more difficult to converge and can provide bad results; indeed, independent component analysis depends more on the initial conditions, because it takes a while to learn the coefficients, and the sources may have moved in that timeframe.

While these technologies provide sound source/speech separation to an extent, there is still room for improvement. Attempts to combine these technologies have heretofore not provided any improvement over existing techniques.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards a technology by which sound, such as speech from two or more speakers, is separated into separated signals by a multiple phase process/system that combines spatial filtering with regularization in a manner that provides significant improvements over other sound separation techniques. Audio signals received at a microphone array are transforming into frequency domain signals, such as via a modulated complex lapped transform, or Fourier transform, or any other suitable transformation to frequency domain. The frequency domain signals are processed into separated spatially filtered signals in the spatial filtering phase, including by inputting the signals into a plurality of beamformers (which may include nullformers). The outputs of the beamformers may be fed into nonlinear spatial filters to output the spatially filtered signals.

In a regularization phase, the separated spatially filtered signals are input into an independent component analysis mechanism that is configured with multi-tap filters corresponding to previous input frames (instead of only using only a current frame for instantaneous demixing). The separated outputs of the independent component analysis mechanism may be fed into secondary nonlinear spatial filters to output separated spatially filtered and regularized signals. Each of the separated spatially filtered and regularized signals into separated audio signals are then inverse-transformed into separated audio signals.

Other advantages may become apparent from the following detailed description when taken in conjunction with the drawings:

BRIEF DESCRIPTION OF THE DRAWINGS

The present invention is illustrated by way of example and not limited in the accompanying figures in which like reference numerals indicate similar elements and in which.

DETAILED DESCRIPTION

Various aspects of the technology described herein are generally directed towards combining beamforming/nullforming/spatial filtering and/or an independent component analysis algorithm in a way that significantly improves sound/speech separation. To this end, there is provided a feed-forward network that includes independent component analysis in the subband domain to maximize the mutual independence of separated current frames, using the information from current and previous multi-channel frames of microphone array signals, including after processing via beamforming/nullforming/spatial filtering. As will be understood, the technology described herein generally has the advantages of beamforming and independent component analysis without their disadvantages, including that the final results can be as robust as a beamformer while approaching the separation of independent component analysis. For example, by initializing independent component analysis with the beamformer values, initialization is not an issue. Further, the values of independent component analysis coefficients may be regularized to beamformer values, thereby making the system more robust to moving sources and shorter time windows for estimation.

It should be understood that any of the examples herein are non-limiting. As one example, while speech separation is described, any audio separation including non-speech may use the technology described herein, as may other non-audio frequencies and/or technologies, e.g., sonar, radio frequencies and so forth. As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used in various ways that provide benefits and advantages in computing and audio processing in general.

Figure 1:
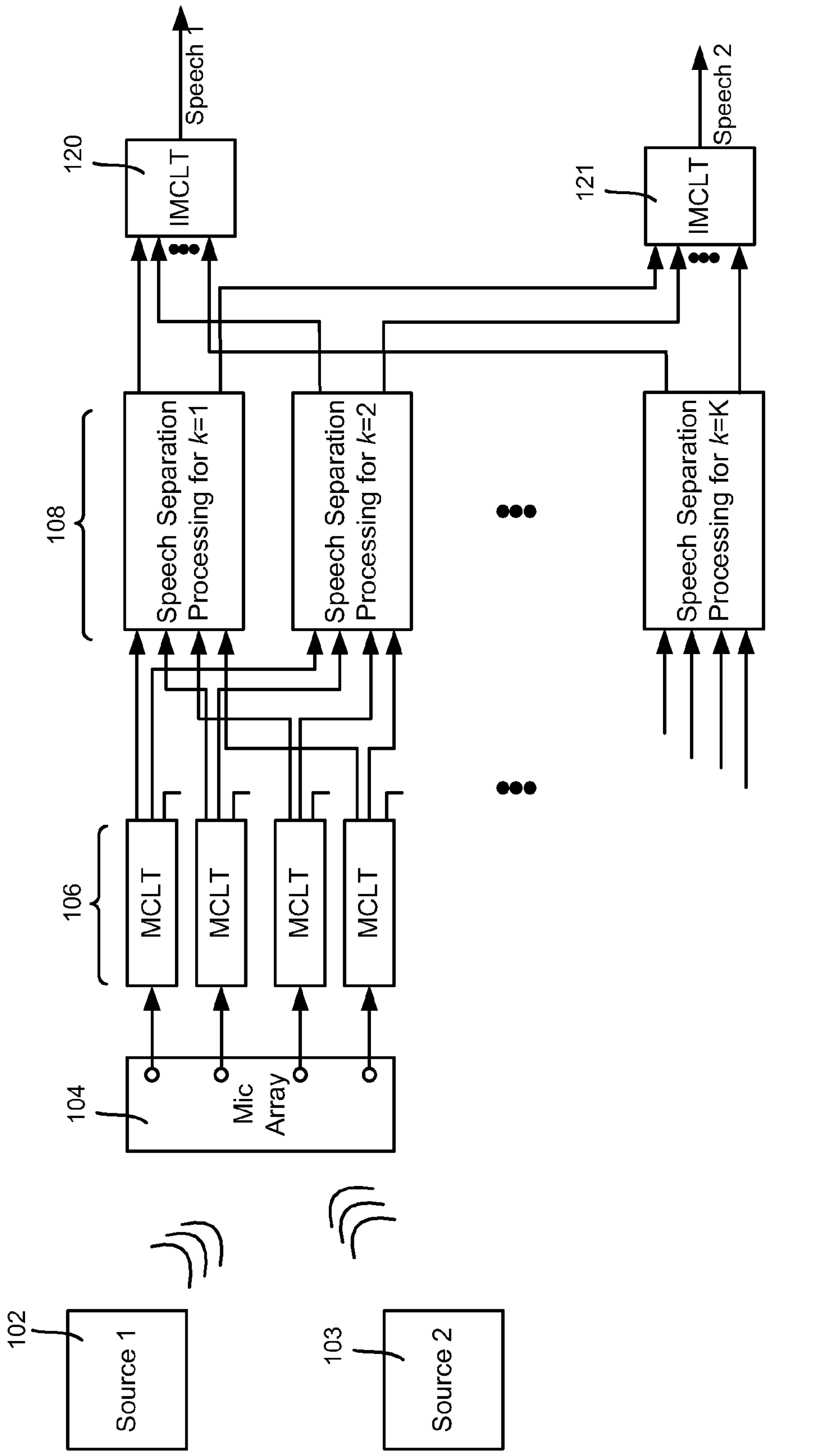
FIG. 1 is a block diagram representing components for sound separation in a subband domain.

FIG. 1 shows a block diagram of regularized feed-forward independent component analysis (ICA) with instantaneous direction of arrival (IDOA) based post-processing. In FIG. 1, two independent speech sources 102 and 103 are separated in the subband domain. To this end, the time-domain signals captured using an array of multiple sensors (e.g., microphones) 104 are converted to the subband domain, in this example by using a modulated complex lapped transform (MCLT, blocks 106) that produces improved separation between frequency bands in an efficient manner. Note that any other suitable transform may be used, e.g., FFT.

The source separation may be performed using a demixing filter (blocks 108) in each individual frequency bin, where k=1, 2, . . . , K is the number of the frequency bins. The resulting signals may be converted back into the time domain using inverse MCLT (IMCLT), as represented by blocks 120 and 121.

Source separation per each frequency bin can be formulated as:

$$S=WY \tag{1}$$

where S is the separated speech vector, W is the demixing matrix, and Y is the measured speech vector in a reverberant and noisy environment.

With respect to beamforming, beamformers may be time invariant, with weights computed offline, or adaptive, with weights computed as conditions change. One such adaptive beamformer is the minimum variance distortionless response (MVDR) beamformer, which in the frequency domain can be described as:

$$W^H = \frac{D^H R_n^{-1}}{D^H R_n^{-1} D} \tag{2}$$

where D is a steering vector, $R_n$ is a noise covariance matrix, and W is a weights matrix. Often the noise only covariance $R_n$ is replaced by R, which is the covariance matrix of the input (signal plus noise). This is generally more convenient as it avoids using a voice activity detector; such a beamformer is known as minimum power distortionless response (MPDR). To prevent instability due to the direction of arrival mismatch, a regularization term is added to the sample covariance matrix. In one implementation, an additional null constraint is also added with the direction to the interference. The beamformer with the extra nullforming constraint may be formulated as:

$$W^H=[1\ 0]([D_t|D_i]^H[R+\lambda I]^{-1}[D_t|D_i])^{-1}[D_t|D_i]^H[R+\lambda I]^{-1} \tag{3}$$

where $D_t$ and $D_i$ are steering vectors toward the target and interference direction respectively, and λ is the regularization term for diagonal loading. With the beam on the target and null on the interference directions, the first-tap of the feed-forward ICA filter may be initialized for appropriate channel assignment.

Additional details of beamforming/spatial processing are described in U.S. Pat. No. 7,415,117 and published U.S. Pat. Appl. nos. 20080288219 and 20080232607, herein incorporated by reference.

Figure 2:
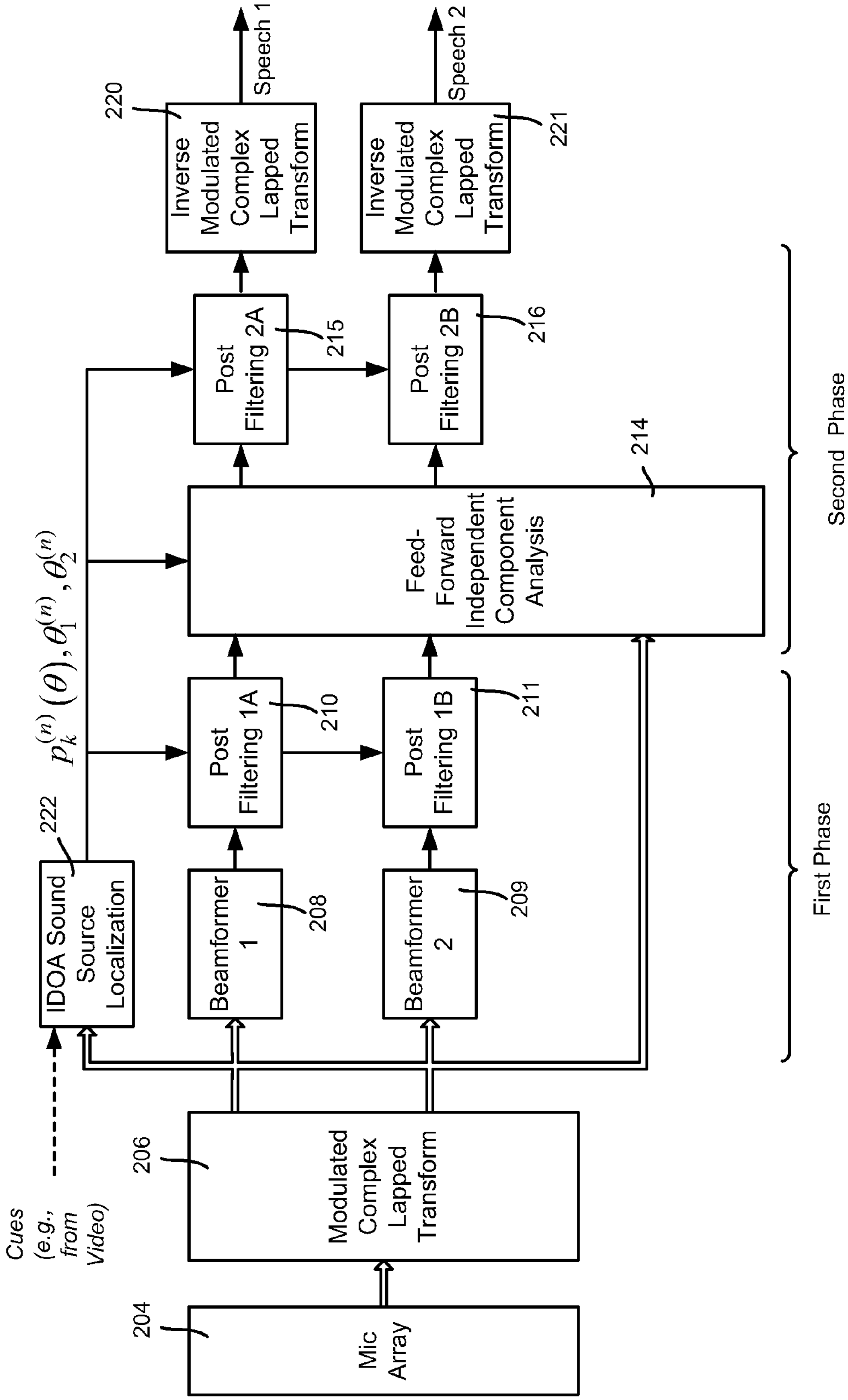
FIG. 2 is a flow diagram representing a two-phase sound separation system, including spatial filtering and regularized feed-forward independent component analysis.

Turning to the combination of conventional subband domain ICA and beamforming, FIG. 2 shows an example block diagram of a two phase mechanism for one subband. The first phase comprises spatial filtering, which separates the sound sources by their positions.

Signals from the microphone array 204 are transformed by a suitable transform 206 (MCLT is shown as an example). In one implementation, a linear adaptive beamformer (MVDR or MPDR), combined with enforced nullformers is used for signal representation, as represented by blocks 208 and 209. This is followed by nonlinear spatial filtering (blocks 210 and 211), which produces additional suppression of the interference signals. In one implementation, the nonlinear spatial filters comprise instantaneous direction of arrival (IDOA) based spatial filters, such as described in the aforementioned published U.S. Pat. Appl. no. 20080288219. Regardless of whether the nonlinear spatial filtering is used after beamforming, the output of the spatial filtering phase comprises separated signals at a first level of separation.

The output of the spatial filtering above is used for regularization by the second phase of the exemplified two-stage processing scheme. The second phase comprises a feed-forward ICA 214, which is a modification of a known ICA algorithm, with the modification based upon using multi-tap filters. More particularly, the duration of the reverberation process is typically longer than a current frame, and thus using multi-tap filters that contain historical information over previous frames allows for the ICA to consider the duration of the reverberation process. For example, ten multi-tap filters corresponding to ten previous 30 ms frames may be used with a 300 ms reverberation duration, whereby equation (1) corresponds to the matrix generally represented in FIG. 3, where n represents the current frame. This is only one example, and shorter frames with correspondingly more taps have been implemented.

As can be seen, the mutual independence of the separated speeches is maximized by using both current and previous multi-channel frames, (multiple taps). For additional separation secondary spatial filters 215 and 216 (another nonlinear spatial suppressor) are applied on the ICA outputs, which are followed by the inverse MCLT 220 and 221 to provide the separated speech signals. In general, this removes any residual interference. Regardless of whether the secondary nonlinear spatial filtering is used after regularization, the output of the second phase comprises separated signals at a second level of separation that is typically a significant improvement over prior techniques, e.g., as measured by signal-to-interference ratios.

For beamforming followed by a spatial filter, to determine the direction of arrival (DOA) of the desired and interference speech signals, an instantaneous DOA (IDOA)-based sound source localizer 222 may be used. IDOA space is M−1 dimensional with the axes being the phase differences between the non-repetitive pairs, where M is the number of microphones.

This space allows estimation of the probability density function $p_k(\theta)$ as a function of the direction $\theta$ for each subband. The results from all subbands are aggregated and clustered.

Note that at this stage, additional cues (e.g., from a video camera, such as attached to a gaming console, or other means) optionally may be used to improve the localization and tracking precision. The sound source localizer provides directions to desired $\theta_1$ and interference $\theta_2$ signals. Given the proper estimation on the DOAs for the target and interference speech signals, the constrained beamformer plus nullformer according is applied as described in equation (3).

Turning to additional details, the consequent spatial filter applies a time-varying real gain for each subband, acting as a spatio-temporal filter for suppressing the sounds coming from non-look directions. The suppression gain is computed as:

$$G_k^{(n)} = \int_{\theta_1-\Delta\theta}^{\theta_1+\Delta\theta} p_k(\theta)d\theta \Big/ \int_{-\pi}^{+\pi} p_k(\theta)d\theta, \tag{4}$$

where $\Delta\theta$ is the range around the desired direction $\theta_1$ from which to capture the sound.

With respect to regularized feed-forward ICA 214 followed by IDOA based post-processing, as described above, the time-domain source separation approach in the subband domain case is utilized by allowing multiple taps in the demixing filter structure in each subband. An update rule for the regularized feed-forward ICA (RFFICA) is:

$$W_i = W_i + \mu((1-\alpha)\cdot\Delta_{ICA,i} - \alpha\cdot\Delta_{First\ stage,i}) \tag{5}$$

where i=0, 1, . . . , N−1, N is the number of taps. $\Delta_{ICA,i}$ and $\Delta_{First\ stage,i}$ represent the portion of the ICA update and the regularized portion on the first stage output.

$$\Delta_{ICA,i} = W_i - \langle g(S(\cdot-(N-1)))Y_{temp}^H(\cdot-i)\rangle_t \tag{6}$$

$$S(\cdot) = \sum_{n=0}^{N-1} W_n(\cdot)Y(\cdot-n) \tag{7}$$

$$Y_{temp}(\cdot) = \sum_{n=0}^{N-1} W_{N-1-n}^H(\cdot)S(\cdot-n) \tag{8}$$

$$\Delta_{First\ stage,i} = \langle (s(\cdot)|_{Ref} - s_{First\ stage}(\cdot))(Y(\cdot-i)|_{Ref})^H\rangle_t \tag{9}$$

where $\langle\cdot\rangle_t$ represents time averaging, (·−i) represents i sample delay, $S_{First\ stage}$ is the first stage output vector for regularization and $|_{Ref}$ represents the reference channels. A penalty term is only applied to the channel where the references are assigned; the other entries for the mixing matrix are set to zero so that the penalty term vanishes on those channel updates.

To estimate the separation weights, equation (5) is performed iteratively for each frequency beam. The iteration may be done on the order of dozens to a thousand times, depending on available resources. In practice, reasonable results have been obtained with significantly fewer than a thousand iterations.

For initialization of the subsequent filters, the reverberation process is modeled as exponential attenuation:

$$W_i = \exp(-\beta i)\cdot I \tag{10}$$

where I is an identity matrix, $\beta$ is selected to model the average reverberation time, and i is the tap index. Note that the first tap of RFFICA for the reference channels is initialized as a pseudo-inversion of the steering vector stack for one implementation so that one can be assigned to the target direction and null to the interference direction:

$$W_{0,ini}|_{ref} = ([e(\theta_t)|e(\theta_i)]^H[e(\theta_t)|e(\theta_i)])^{-1}[e(\theta_t)|e(\theta_i\theta]^H. \tag{11}$$

Because the initialized filter is updated using ICA, a slight mismatch with actual DOA may be adjusted in an updating procedure. In one implementation, $\alpha$ is set to 0.5 just to penalize the larger deviation from the first stage output. As a nonlinear function g(·), a polar-coordinate based tangent hyperbolic function is used, suitable to the super-Gaussian sources with a good convergence property:

$$g(X) = \tanh h(|X|)\exp(j\measuredangle X) \tag{12}$$

where $\measuredangle X$ represents the phase of the complex value X. To deal with the permutation and scaling, the steered response of the converged first tap demixing filter is used:

$$S_l = \frac{S_l}{F_l}\cdot\left(\frac{|F_l|}{\max|F|}\right)^{\gamma} \tag{13}$$

where l is the designated channel number, $F_l$ is the steered response for the channel output, F is the steered response to the candidate DOAs. To penalize the non-look direction in the scaling process, nonlinear attenuation is added with the normalization using the steered response. In one implementation, $\gamma$ is set as one (1). The spatial filter also penalizes on the non-look directional sources in each frequency bin.

By taking previous multi-channel frames into consideration (rather than using only current frames for instantaneous demixing), the technology described herein thus overcomes limitations of the subband domain ICA in a reverberant acoustic environment, and also increases the super-Gaussianity of the separated speech signals. The feed-forward demixing filter structure with several taps in the subband domain is accommodated with natural gradient update rules. To prevent permutation and arbitrary scaling, and guide the separated speech sources into the designated channel outputs, the estimated spatial information on the target and interference may be used in combination with a regularization term added on the update equation, thus minimizing mean squared error between separated output signals and the outputs of spatial filters. After convergence of the regularized feed-forward demixing filter, improved separation of the speech signals is observed, with audible late reverberation for both desired and interference speech signals. These reverberation tails can be substantially suppressed by using spatial filtering based on instantaneous direction of arrival (IDOA), giving the probability for each frequency bin to be in the original source direction. This post-processing also suppresses any residual interference speech coming from non-look directions.

Exemplary Operating Environment

Figure 3:
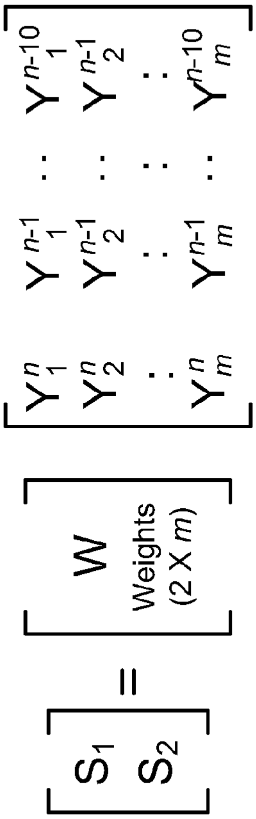
FIG. 3 is a representation of a matrix computed for a frequency beam that uses multi-tap filtering based on previous frames for speech separation.
Figure 4:
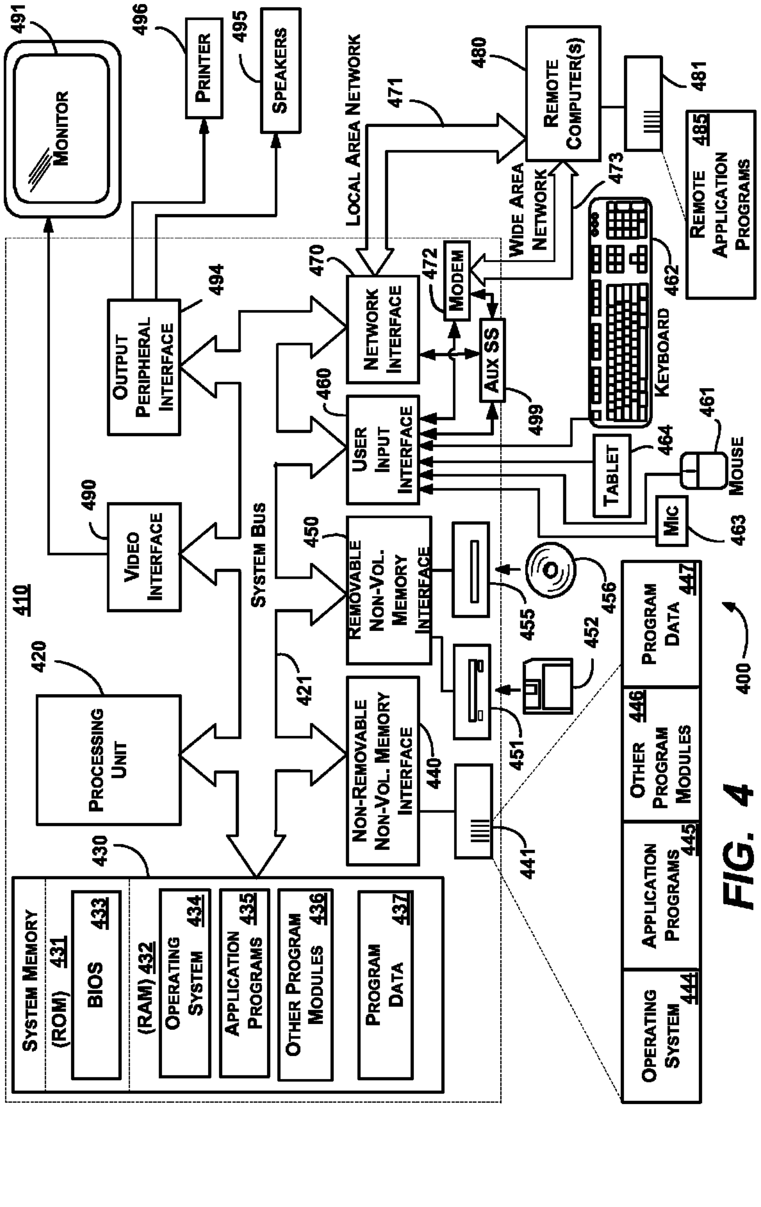
FIG. 4 shows an illustrative example of a computing environment into which various aspects of the present invention may be incorporated.

FIG. 4 illustrates an example of a suitable computing and networking environment 400 on which the examples of FIGS. 1-3 may be implemented. The computing system environment 400 is only one example of a suitable computing environment and is not intended to suggest any limitation as to the scope of use or functionality of the invention. Neither should the computing environment 400 be interpreted as having any dependency or requirement relating to any one or combination of components illustrated in the exemplary operating environment 400.

The invention is operational with numerous other general purpose or special purpose computing system environments or configurations. Examples of well-known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 4, an exemplary system for implementing various aspects of the invention may include a general purpose computing device in the form of a computer 410. Components of the computer 410 may include, but are not limited to, a processing unit 420, a system memory 430, and a system bus 421 that couples various system components including the system memory to the processing unit 420. The system bus 421 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 410 typically includes a variety of computer-readable media. Computer-readable media can be any available media that can be accessed by the computer 410 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 410. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above may also be included within the scope of computer-readable media.

The system memory 430 includes computer storage media in the form of volatile and/or nonvolatile memory such as read only memory (ROM) 431 and random access memory (RAM) 432. A basic input/output system 433 (BIOS), containing the basic routines that help to transfer information between elements within computer 410, such as during start-up, is typically stored in ROM 431. RAM 432 typically contains data and/or program modules that are immediately accessible to and/or presently being operated on by processing unit 420. By way of example, and not limitation, FIG. 4 illustrates operating system 434, application programs 435, other program modules 436 and program data 437.

The computer 410 may also include other removable/non-removable, volatile/nonvolatile computer storage media. By way of example only, FIG. 4 illustrates a hard disk drive 441 that reads from or writes to non-removable, nonvolatile magnetic media, a magnetic disk drive 451 that reads from or writes to a removable, nonvolatile magnetic disk 452, and an optical disk drive 455 that reads from or writes to a removable, nonvolatile optical disk 456 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 441 is typically connected to the system bus 421 through a non-removable memory interface such as interface 440, and magnetic disk drive 451 and optical disk drive 455 are typically connected to the system bus 421 by a removable memory interface, such as interface 450.

The drives and their associated computer storage media, described above and illustrated in FIG. 4, provide storage of computer-readable instructions, data structures, program modules and other data for the computer 410. In FIG. 4, for example, hard disk drive 441 is illustrated as storing operating system 444, application programs 445, other program modules 446 and program data 447. Note that these components can either be the same as or different from operating system 434, application programs 435, other program modules 436, and program data 437. Operating system 444, application programs 445, other program modules 446, and program data 447 are given different numbers herein to illustrate that, at a minimum, they are different copies. A user may enter commands and information into the computer 410 through input devices such as a tablet, or electronic digitizer, 464, a microphone 463, a keyboard 462 and pointing device 461, commonly referred to as mouse, trackball or touch pad. Other input devices not shown in FIG. 4 may include a joystick, game pad, satellite dish, scanner, or the like. These and other input devices are often connected to the processing unit 420 through a user input interface 460 that is coupled to the system bus, but may be connected by other interface and bus structures, such as a parallel port, game port or a universal serial bus (USB). A monitor 491 or other type of display device is also connected to the system bus 421 via an interface, such as a video interface 490. The monitor 491 may also be integrated with a touch-screen panel or the like. Note that the monitor and/or touch screen panel can be physically coupled to a housing in which the computing device 410 is incorporated, such as in a tablet-type personal computer. In addition, computers such as the computing device 410 may also include other peripheral output devices such as speakers 495 and printer 496, which may be connected through an output peripheral interface 494 or the like.

The computer 410 may operate in a networked environment using logical connections to one or more remote computers, such as a remote computer 480. The remote computer 480 may be a personal computer, a server, a router, a network PC, a peer device or other common network node, and typically includes many or all of the elements described above relative to the computer 410, although only a memory storage device 481 has been illustrated in FIG. 4. The logical connections depicted in FIG. 4 include one or more local area networks (LAN) 471 and one or more wide area networks (WAN) 473, but may also include other networks. Such networking environments are commonplace in offices, enterprise-wide computer networks, intranets and the Internet.

When used in a LAN networking environment, the computer 410 is connected to the LAN 471 through a network interface or adapter 470. When used in a WAN networking environment, the computer 410 typically includes a modem 472 or other means for establishing communications over the WAN 473, such as the Internet. The modem 472, which may be internal or external, may be connected to the system bus 421 via the user input interface 460 or other appropriate mechanism. A wireless networking component such as comprising an interface and antenna may be coupled through a suitable device such as an access point or peer computer to a WAN or LAN. In a networked environment, program modules depicted relative to the computer 410, or portions thereof, may be stored in the remote memory storage device. By way of example, and not limitation, FIG. 4 illustrates remote application programs 485 as residing on memory device 481. It may be appreciated that the network connections shown are exemplary and other means of establishing a communications link between the computers may be used.

An auxiliary subsystem 499 (e.g., for auxiliary display of content) may be connected via the user interface 460 to allow data such as program content, system status and event notifications to be provided to the user, even if the main portions of the computer system are in a low power state. The auxiliary subsystem 499 may be connected to the modem 472 and/or network interface 470 to allow communication between these systems while the main processing unit 420 is in a low power state.

CONCLUSION

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. In a computing environment, a method performed on at least one processor comprising, receiving signals in a frequency domain corresponding to signals received at plurality of sensors, processing the signals using spatial filtering to separate the signals based on their positions into spatially filtered signals separated at a first level of separation, inputting the spatially filtered signals to an independent component analysis mechanism configured with multi-tap filters, and processing the spatially filtered signals in the independent component analysis mechanism to provide output signals corresponding to a second level of separation.

2. The method of claim 1 wherein the plurality of sensors comprises a microphone array, and further comprising, performing a transform on outputs of the microphone array to provide the signals in the frequency domain, and performing an inverse transform on each of the output signals corresponding to the second level of separation to produce separated speech.

3. The method of claim 2 wherein performing the transform comprises performing a modulated complex lapped transform, or Fourier transform, or another transformation to frequency domain.

4. The method of claim 1 wherein processing the signals using spatial filtering comprises inputting the signals into a plurality of beamformers.

5. The method of claim 1 wherein processing the signals using spatial filtering comprises inputting the signals into a plurality of beamformers, each beamformer including a nullformer.

6. The method of claim 1 wherein processing the signals using spatial filtering comprises inputting the signals into a plurality of beamformers, each beamformer including a nullformer, and further processing output from each beamformer with nonlinear spatial filtering to provide the separated signals at the first level of separation.

7. The method of claim 6 further comprising, providing instantaneous direction of arrival sound source localization data for use in the nonlinear spatial filtering.

8. The method of claim 7 further comprising, inputting cues to an instantaneous direction of arrival sound source localization mechanism that provides the instantaneous direction of arrival sound source localization data.

9. The method of claim 8 wherein inputting the cues comprises providing video signals for localization or tracking, or for both localization and tracking.

10. The method of claim 1 wherein processing the spatially filtered signals in the independent component analysis mechanism to provide the output signals corresponding to the second level of separation comprises performing nonlinear spatial filtering on each output signal from the independent component analysis mechanism.

11. A system comprising:

a memory, wherein the memory comprises computer useable program code;

one or more processing units, wherein the one or more processing units execute the computer useable program code configured to implement a spatial filtering mechanism, the spatial filtering mechanism comprising a plurality of beamformers that receive frequency domain signals corresponding to speech sensed at a microphone array, each beamformer outputting signals to a nonlinear spatial filter to provide spatially filtered signals separated at a first level of separation;

a feed-forward independent component analysis mechanism that receives the spatially filtered signals, the independent component analysis mechanism processing the spatially filtered signals into output signals by performing computations based upon multi-tap filters to provide separated output signals corresponding to a second level of separation.

12. The system of claim 11 further comprising secondary nonlinear spatial filters, each secondary nonlinear spatial filters inputting one of the separated output signals from the independent component analysis mechanism and outputting filtered output signals at the second level of separation.

13. The system of claim 12 further comprising wherein the inverse transform component comprises an inverse modulated complex lapped transform.

14. The system of claim 11 wherein at least one of the beamformers comprises a minimum power distortionless response beamformer combined with a nullformer, or a minimum variance distortionless response combined with a nullformer.

15. The system of claim 11 further comprising an instantaneous direction of arrival sound source localization component that provides data to the nonlinear spatial filters.

16. The system of claim 15 wherein the instantaneous direction of arrival sound source localization component inputs video cues for use in providing the data.

17. The system of claim 11 wherein the beamformers receive the frequency domain signals from a modulated complex lapped transform.

18. In a computing environment, a method performed on at least one processor comprising:

transforming audio signals received at a microphone array into frequency domain signals;

processing the frequency domain signals into separated spatially filtered signals in a spatial filtering phase, including inputting the signals into a plurality of beamformers and feeding outputs of the beamformers into nonlinear spatial filters that output the spatially filtered signals;

using the separated spatially filtered signals in a regularization phase, including inputting the separated spatially filtered signals into an independent component analysis mechanism configured with multi-tap filters, and feeding outputs of the independent component analysis mechanism into secondary nonlinear spatial filters that output separated spatially filtered and regularized signals; and transforming, via an inverse transform, each of the separated spatially filtered and regularized signals into separated audio signals.

19. The method of claim 18 wherein each beamformer includes a nullformer, and wherein transforming the audio signals transform comprises performing a modulated complex lapped transform.

20. The method of claim 18 further comprising, providing instantaneous direction of arrival sound source localization data to the nonlinear spatial filters and secondary nonlinear spatial filters.

* * * * *